Nov. 11, 1969         P. M. BURN ET AL         3,477,529
         SIMPLIFIED AUTOMATIC CHARGING SYSTEM FOR BLAST FURNACES
Filed July 5, 1967                              3 Sheets-Sheet 1

Patrick Marion Burn and
Ronald Arthur Nevison,
                Inventors

By, Wenderoth, Lind & Ponack, Attys

United States Patent Office 3,477,529
Patented Nov. 11, 1969

3,477,529
SIMPLIFIED AUTOMATIC CHARGING SYSTEM
FOR BLAST FURNACES
Patrick Marion Burn and Ronald Arthur Nevison, Wollongong, New South Wales, Australia, assignors to Australian Iron & Steel Pty. Limited, Sydney, New South Wales, Australia, a corporation of New South Wales, Australia
Filed July 5, 1967, Ser. No. 651,202
Claims priority, application Australia, July 6, 1966, 7,976/66
Int. Cl. G01g 19/52
U.S. Cl. 177—50                    6 Claims

ABSTRACT OF THE DISCLOSURE

The invention is for an apparatus for automatically measuring and feeding weighed ingredients from stock bins or the like to a blast furnace without having to provide weighing devices at or near the individual bins. Logic means are used on which programmed set point weights for each ingredient can be set. Instructions are passed to a selected bin and a vibratory feeder associated with it so that the bin feeds for a preselected time determined by the programme set point weight as modified by the accumulated errors in feeding (called the feed set point weight). The actual weight delivered to a weigh hopper is measured and compared with the programme set point weight and, when the error exceeds a set value, the error is used to adjust the feed set point weight to a new value. The actual weight may also be compared with the feed set point weight to obtain an error signal to adjust the feed rate. The rate of weight increase can be measured and used to modify the feed time to allow for material lying on the belt after feed stops.

---

The present invention relates to methods of and apparatus for automatically measuring and feeding, in controlled amounts by weight, various ingredients from the stock bins or other supply sources to the conveying or transporting equipment depositing the material into a blast furnace, without the need to provide weighing devices at or near the individual bins or feed points.

In the automatic charging of blast furnaces, methods have been employed which cause material of various kinds, stored in stock bins, to be automatically fed, either over continuous weighers, or into weigh bins equipped with devices for accurately determining the weight of contained material, these being arranged in such a way as to automatically stop the ingress of further material when a desired weight has been received.

The accuracy of such systems has, for the most part, been determined solely by that of the weighing apparatus in conjunction with the precision of the regulating equipment utilised to control the rate of flow of the weighed material.

More recently systems have appeared wherein the individual weighing errors observed as the result of inaccuracies in the foregoing control system have been accumulated until a sufficient aggregate is reached to permit this accumulated error to be compensated by a like under or over-feeding of a subsequent load of similar material. In this manner it is possible to limit the long term error in material fed to a small fraction of the weight of a single load or batch. Such systems of limitation of the integrated error have been used in conjunction with the type of accurate batch weighing systems previously adopted and serve merely to limit the accumulated errors of same.

A characteristic of all such feeding systems is that separate weighing devices are provided near each supply bin of the furnace stocking system. This provision results in considerable equipment outlay and increased structural height of the whole stock bin array to accommodate the weighing equipment below the bin outlets yet above the transfer belts.

The invention provides systems of automatic weighing whereby these separate weighing devices may be eliminated from the immediate vicinity of the bins allowing simplification of the structure, economies in the overall height of the system, and substantial reductions in the quantity of weighing and control equipment to be provided and serviced.

Reference will now be made to the accompanying drawings in which.

BASIC CONSIDERATIONS

Figure 1:
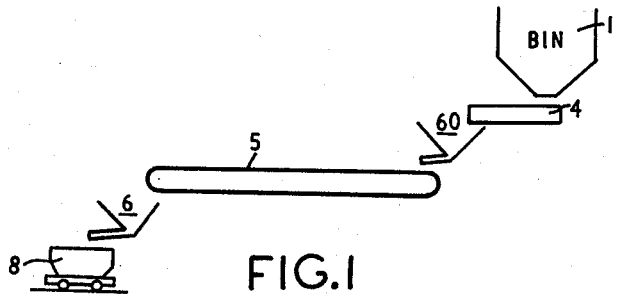
FIGURE 1 is a diagrammatic showing of a system at present in use which is used in explaining the invention.

Referring to FIGURE 1 of the drawings, in the usual arrangement bin 1, which represents one of a number of material storage bins in a Blast Furnace stocking system, is located some distance from the skip or other hoisting conveyance. A conveyor belt 5 is normally used to transport feed materials to a collecting or weight hopper 6 where the charge may be held, and, if desired, check weighed, preparatory to the discharge to furnace feed elevating system shown as a skip 8.

It is normal to batch weigh in a hopper 60, near the bin 1, or meter via a belt weighing device, the charge of material fed to the transfer conveyor 4. The present invention eliminates the separate weigh hoppers or weigh belts at the supply hoppers by either of two methods, namely, (A) providing means for feeding required quantities from the bins 1, without recourse to weigh devices adjacent the bins, or (B) weighing material in the single collecting hopper at the delivery end of belt 5.

In both methods a system of limitation of integrated error is adopted.

Method A

An individual material feeder is selected of a type which delivers at a substantially constant rate so that the amount of material fed becomes a linear function of time. The desired quantities of material are then programmed by applying the set-point weight so that it is presented to the feeder device as a proportional operating time. The material is fed for this time and conveyed to a single weigh hopper above the skip or other charging mechanism.

The programme set point weight is automatically compared with a weight signal derived from a weighing mechanism associated with this hopper. When the material ceases to flow into the hopper, the discrepancy between the weight and the programme set-point weight is fed to a counting mechanism which stores the error of this and previous weighing of this particular material on a continuous basis. The feeder set-point weight is the programme set point less a correction for accumulated error and is also compared with the delivered weight and any error fed to a gating mechanism which has a predetermined error dead band established within it. If the error of this individual weighing exceeds the dead band then a proportional adjustment will automatically be made to the feeder flow rate via the flow control mechanism of the feeder. In this way errors in the constant of proportionality between total weight fed and time will rapidly become corrected. Such errors may be either the result of initial wrong adjustment, or a progressive change of material bulk density due to say, moisture or other variable.

The main error accumulator earlier referred to may take the form of a bi-directional counter, having preset limits, representing the maximum accumulated error it is intended to permit. The purpose of the foregoing correction adjustment in feed rate referred to above is to ensure that the accumulated error is not constantly driven to the limit of its range by wrong feeder settings.

When the accumulated error exceeds a preset limit, the amount then standing on the counter is automatically substracted from the programme set point weight to derive the feeder set point weight so that when this material is next weighed a negative error in weighing referred to programme set point weight should appear. As the error accumulator will always be connected to receive the error in weight relative to the programme set point weight, this corrective weighing should theoretically reduce the accumulator total to zero. In practice, a small error may remain due to inaccuracy of the correction weighing. However, this should be well inside the accumulated error limits.

The constant running count standing in the accumulator will therefore represent the aggregate weight error per material over the whole duration of the process and the integrated error will always automatically be kept within limits.

The accumulator used can be of the simplest type and certainly full computer facilities or anything approaching these are not necessary, though the operation may be performed in a computer if this is convenient and exists for other purposes.

Accuracy of individual load weight depends upon repeatable performance of the feeder devices and this may be optimised by employing commercial designs of vibrating feeders incorporating regulated supply voltage and/or feeder amplitude. By the above means, all weighing devices may be eliminated with the exception of the single receiving bin weigher, and, by feeding directly to the belts, collecting weigh hoppers at the bins or weigh feeders or belts in these regions may be totally eliminated.

The system also lends itself well to blending of materials without the need for further substantial equipment outlay because any desired number of bins can be made to simultaneously feed to the main collecting belt in a ratio determined by the time of feeder operation. As the feeders themselves are operating in open loop mode, the blending ratio can be simply programmed and will normally be of adequate accuracy for blending purposes. The total accuracy is still subjected to monitoring and correction in the receiving weigh hoppers.

To retain feed accuracy for relatively small set point quantities, the feed rate would be automatically stepped down to prolong the feeding time and thus render cut-off errors of minimum concern.

Since it is proposed that the feeders would operate in a simple stop-go mode without taper then the feeding capacity of an individual feeder is available to maximum value, minimising the feeder capacity required.

The method just described generally will now be further described with reference to FIGURE 2 which shows diagrammatically one form of apparatus in accordance with that method.

Figure 2:
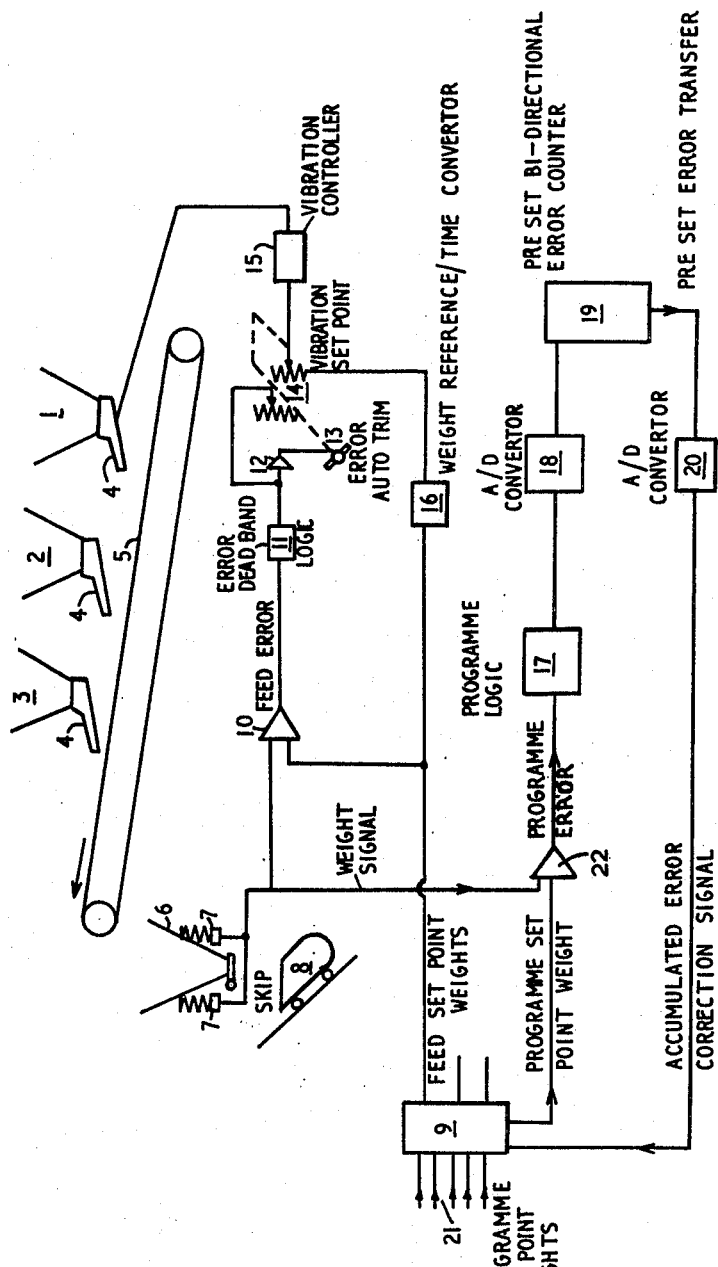
FIGURE 2 is a diagrammatic showing of apparatus according to a first method in accordance with the present invention.

Referring now to FIGURE 2, bins 1, 2 and 3 represent the many raw material bins normally forming a typical blast furnace stock house. Material is normally drawn from these bins one at a time and once for each journey of the skip 8 to supply material to the top of the furnace.

In each case the bin material is fed to a transfer belt 5 from a vibrating feeder 4. The belt transfers the material to a weigh hopper 6 situated above the skip pit and mounted on weight sensors 7 which may be of any commercially available type yielding an electrical output proportional to hopper load. The opening of this hopper to discharge to the skip is performed by any conventional form of actuator under the control of a furnace automatic electric programme system, which also starts and stops the skips.

The order and amounts in which material is charged in an automatic charging system are determined by a preset programme, nowadays comprising some form of static logic switching system into which operators set by dials, cards or other input means the required weights and sequences. These are illustrated in FIGURE 2 by the manual inputs 21 representing weights of materials. The programme logic 9 maintains furnace stock levels at required heights by operating the charging system.

Assuming the programme logic 9 is about to command material, the following operations follow:

The logic 9 selects the bin to be used and the time convertor 16 and error amplifier 10 associated with this bin. Only the components associated with bin 1 have been shown in this figure, but similar components will be associated with each of the other bins. An analogue voltage signal proportional to the feed set point weight is sent from the logic to 10 and 16. This feed set point differs from the programme set point preselected by the operator by an accumulated error signal fed from 19 but this will be ignored for the moment. The reference/time convertor 16 will switch on the vibro feeder 4 of the selected bin, in this case bin 1, for a time proportionate to the analogue input as measured by power cycle counting via the vibro feeder's normal amplitude setter 14 and vibration controller 15.

The material commences to enter the weight hopper 6 but the rising weight signal from the weight sensors 7 is blocked by logic elements 11 and 17 until feeding ceases. When the time measured by convertor 16 has elapsed, the feeder is stopped and a set time allowed for transit of all material to bin 6.

Logic 11 and 17 are then programmed to accept passage of information. The output of sensors 7 now stands at the measured weight of the charge. This is fed to comparator amplifier 10 which also is connected to receive the feed set point signal in an opposing polarity. The output of 10 represents as a voltage the feed weight error. If this error is above a small tolerance represented by a dead band gate in 11, it is passed as a reference signal to a servo amplifier 12 which homes the feeder amplitude setter 14 to a proportional positional adjusted to compensate for the feed error, the drive being by servo motor 13. For slow changes in binned material characteristics the vibro-feeder in one or more operations self-calibrates to the order of the dead band in 11.

The output of weight sensor 7 is also connected to compare in error amplifier 22 the charge weight to the programmed weight requirement set by the operator into the programme. The error, called programme error, remaining at the end of feeding is in this case released by logic section 17 and, after being transformed to digital form in analogue digital converter 18, is stored in counter 19, one counter existing for each kind of charge material and being switched in by logic 9.

Counters 19 are bi-directional presettable devices of commercially available type. The settings applied correspond to the maximum plus or minus integrated error per material the operators wish to accept.

If the count in 19 exceeds the permitted setting its value is released via digital to analogue convertor 20 to an input channel of programme logic 9. Logic 9 subtracts any value standing on this input from the programme set point weight (or adds it depending on error sense) to produce the feed set point weight of each weighing. The feeder will thus be programmed to sufficiently under or over feed to theoretically eliminate the standing error in counter 19. Servo, 12, 13, 14 therefore tends to limit individual feed errors while the spill from counter 19 limits aggregate error.

Method B

In weighing at the collecting hopper the solution of starting and stopping the conveyor belt to cut-off feed is defeated by the need to clear the belt of each load. This condition is imposed by the sharing of a common belt by different materials and sources. Clearing the belt while maintaining an accurately delivered weight implies knowing closely the quantity of material lying on the belt at the instant the bin feeder is cut-off. The bin must then be cut-off at the instant the weight measured in the collecting hopper is short weight by the amount then residing on the belt.

This quantity will vary from bin to bin in accordance with distance from the collecting hopper and also with the rate of feed prevailing from the particular bins.

Figure 3:
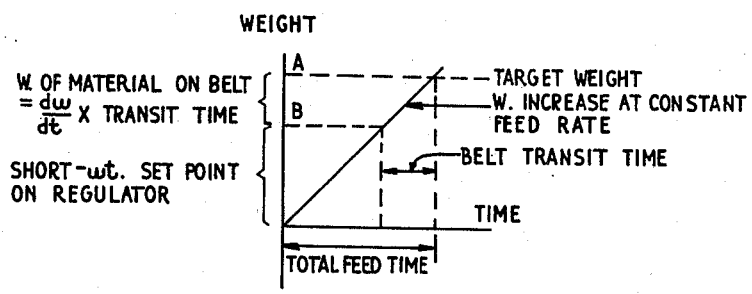
FIGURE 3 is a chart used in describing a second form of the invention.

The principles used to satisfy these needs are illustrated in FIGURE 3.

The diagram depicts graphically the increase in weight of material in the collecting hopper with time until target weight required is reached assuming a constant rate of feed. As the total ordinate A represents the target weight required then any weight regulator operating on a weight signal received from the receiving hopper sensor must cut-off the bin feeder at a premature weight B such that the definciency A less B resides on the belt and will ultimately arrive in the collector hopper.

If the rate of increase of hopper weight remains constant during the entire feeding operation then the material on the belt once the belt fills is given by $dW/dt \times$ transit time of belt where $dW/dt$ represent the rate of increase of delivered material. Theoretically then it is only necessary to reduce the target weight set point A by an amount A-B derived by differentiating the weight/time function measured at the collecting hopper to bring about correct feed shut-off.

Sources of error in the above assumptions are:
(1) Variation in the feed rate close to the moment of shut-off relative to earlier phases to filling which may cause an incorrect measure of belt storage.
(2) Fluctuations in the apparent rate of short time feed due to lumps of material falling into the hopper.
(3) Variation in transfer belt speed resulting in an erroneous estimate of belt storage.

Tests indicate that in the short time of *a given weighing* the average rate of feeding by a vibro-feeder from a bin supplying blast furnace materials is unlikely to be affected by *bin* conditions to a significant degree. In practice, variations due to 1 are small and can be prevented from growing due to vibrator variations by control of supply voltage or amplitude of the vibrating feeder.

Errors due to 2 require averaging of the rate of weight growth so that instantaneous load shocks are absorbed. Choice of an averaging time which is an appreciable proportion of fill time, minimises small inaccuracies of estimating material on the belt due to minor feed fluctuations.

Belt drive speed can be regulated to a constancy of ¼% or better by modern drive control techniques as necessary so that errors due to 3, may readily be kept within tolerable bounds.

Figure 4:
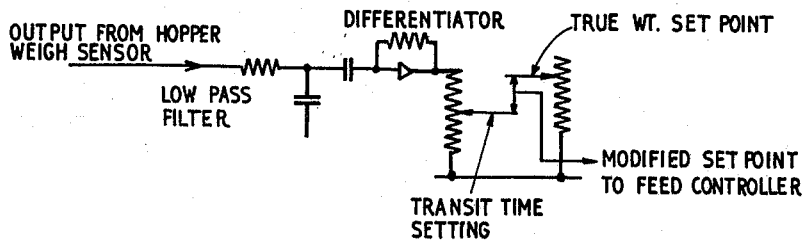
FIGURE 4 is a circuit portion of the system shown in FIGURE 5.

FIGURE 4 illustrates the basic circuit arrangements adopted for proto-type tests. A low pass filter integrates the weight growth at a rate slow enough to absorb feed impacts.

The following differentiator produces an output proportional to the mean value of $dW/dt$ considered over suitable filtration time constant discussed above. The potentiometer following the differentiator applies a multiplier which can be adjusted to represent various belt transit times. Its voltage output represents analoguously the weight of material on the belt. The arrangement shown represents one way of subtracting this storage quantity from the operators set point weight to yield a reference signal to the weigh hopper cut-off regulator.

In practice other forms of integrator and differentiators may be used for particular convenience.

Since, normally, operations are concerned with only one feeder and one material, at one time, great simplification and reduction of equipment is possible by time sharing.

Only on weight regulator is required for the single collecting weigh hopper located on each side of the furnace.

All bin feeders may share a common regulating power source being isolated in turn by contactors from this source to provide simultaneously selection means and positive lockout against inadvertent operation.

With low weight set points accuracy may be enhanced by slower feed rates both to improve feeder cut-off and lower the belt storage to a minimum percentage of the desired weight.

The furnace control logic system may readily be arranged to supply in turn:
(a) Weight references to the common weigh control.
(b) Amplitude settings according to desired weight to the common vibrator power pack.
(c) Selection signals to bring in the correct bin.
(d) Appropriate transit time setting for the bin location concerned.

Figure 5:
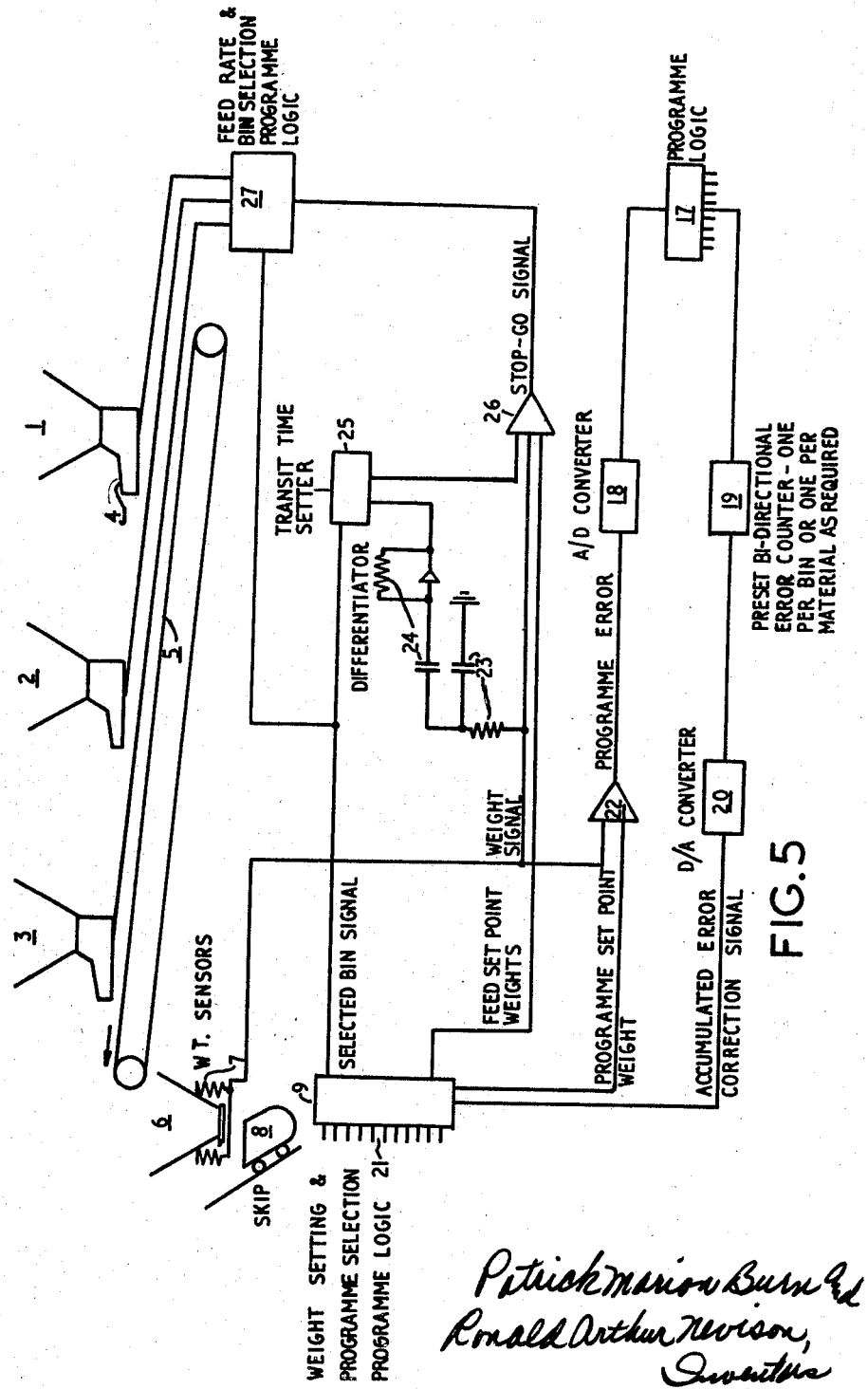
FIGURE 5 is a diagrammatic showing of apparatus according to a second method in accordance with the present invention.

Reference will now be made to FIGURE 5.

As in the case of FIGURE 2, bins 1, 2, and 3 represent the many raw material bins normally forming a typical blast furnace stock house. Material is normally drawn from these bins one at a time and once for each journey of the skip 8 to supply material to the top of the furnace.

In each case the bin material is fed to a transfer belt 5 from a vibrating feeder 4. The belt transfer the material to a weigh hopper 6 situated above the skip pit and mounted on weight sensors 7 which may be of any commercially available type yielding an electrical output proportional to hopper load. The opening of this hopper to discharge to the skip is performed by some known form of actuator under the control of a furnace automatic electric programme system.

The order and amounts in which material is charged in an automatic charging system are determined by a preset programme, nowadays comprising some form of static logic switching system into which operators set by dials, cards or other input means the required weights and sequences. These are typified by the manual inputs 21 representing weights of materials. The programme logic 9 maintains furnace stock levels at required heights by operating the charging system.

Assuming the programme logic 9 is about to command material, the following operations follow:

The main programme logic switching system 9 selects the material and load weight to be next measured and this information is transmitted to bin selection and feed rate logic switching 27 causing the appropriate material feeder 4 to be connected to the control amplifier 26 and presets a feeder rate low enough to limit material residing on the belt 5 to a moderate proportion of the target weight. At the same time the bin chosen by logic 9 will have a transit time setting applied by setter 25 appropriate to that part of the length of belt 5 utilised by the chosen bin.

Logic system 9 transmits an analogue voltage to control amplifier 26 proportional to the programme set point weight, namely the desired weight nominated in the programme, as modified by an analogue quantity from digital to analogue convertor 20 in a manner to be later described. This quantity, called the feed set point weight, is continuously compared with the voltage output from weight sensors 7 supporting the weigh hopper 6 so that the difference represents the discrepancy in set weight.

The output from weight sensors 6 is also filtered by a low pass filter 23 to remove the effects of impacts caused by random lumps of material falling into hopper 6. The filtered signal is differentiated by differentiator 24 to produce an output voltage analogous to the rate of increase in weight of received material, this rate being averaged over the integration time of the filter 23. The rate of change of weight is now associated with the transport time for the relevant portion of belt 5 by the transit time setter 25 which has been set previously as described. The suitably scaled value of weight rate of change resulting is combined in control amplifier 26 so as to reduce the feed set point weight by an amount representing the material in transit on the belt.

When the discrepancy in these inputs to 26 is relatively large it triggers logic system 27 to run the chosen feeder. When the sum of signals from sensors 7 and transit time setter 25 is very close to the feed set point weight control amplifier 26 cuts off, stopping the feeder and allowing the belt to top the load received in hopper 6 with material then on the belt. The belt 5 is controlled to run at closely constant speed by a speed regulated drive to prevent significant changes in weight of material stored on the belt.

The output of weight sensor 7 is also connected to compare the charge weight to the programmed weight requirement set by the operator into the programme (a programme set point weight). The error remaining at the end of feeding is in this case released by logic section 17 and after being transformed to digital form in 18, stored in counter 19, one counter existing for each kind of charge material and being switched in by logic 9.

Counters 19 are bi-directional presettable devices of commercialy available type. The settings applied correspond to the maximum plus or minus integrated error per material the operators wish to accept.

If the count in 19 exceeds the permitted setting its value is released via digital to analogue convertor 20 to an input channel of programme logic 9. Logic 9 substracts any value standing on this input from the programme set point weight (or adds it depending on error sense) to produce the feed set point weight of each weighing. The feeder will thus be programmed to sufficiently under or over feed to theoretically eliminate the standing error in counter 19.

What we claim is:

1. Apparatus for automatically measuring and feeding, in controlled amounts by weight, ingredients from stock bins to the conveying equipment for a blast furnace comprising a plurality of stock bins comprising one stock bin for each ingredient to be supplied, a weigh hopper spaced from said bins, means common to said bins for feeding electively from each bin the ingredient contained therein for a predetermined time at a substantially constant rate so that substantially a feed set point weight of the selected ingredient is fed to said weigh hopper, means for deriving a signal proportional to the weight of the selected ingredient in said weigh hopper at the end of the feed, means for comparing said signal with a signal proportional to a programme set point weight for that ingredient and for deriving an error signal, means for accumulating said errors, means for deriving a signal corresponding to said feed set point weight by applying said acumlated error sinal when it exceeds pre-set limits to said programme set point weight signal, means for controlling said predetermined feed time by a signal corresponding to said feed set point weight, and means for selecting the bins in pre-set order.

2. Apparatus as set forth in claim 1 including further comparison means for comparing the signal proportional to the weight of the ingredient in the hopper with the signal corresponding to the feed set point weight and deriving a further error signal, and means for adjusting the said rate of feed in accordance with said further error signal.

3. Apparatus as set forth in claim 1 including means for deriving a signal proportional to the rate of change of weight with time of the ingredient in the hopper, further comparison means for comparing the signal proportional to the weight of the ingredient in said hopper with the signal corresponding to the feed set point weight less a signal equal to said signal porportional to said rate of change of weight of the ingredient in said hopper multiplied by a transit time factor for the selected bin, and means for stopping the feed from said bin to said feeding means when the differences between the compared signals is below a set limit.

4. Apparatus as set forth in claim 3 wherein said signals are each analog signals, and wherein the means for deriving said signal proportional to said rate of change includes means for filtering the analog signal corresponding to the weight in said hopper and means for differentiating with respect to time the filtered analog weight signal.

5. In apparatus for weighing the amounts of ingredients supplied to a blast furnace the combination comprising a plurality of stock bins comprising one stock bin for each ingredient to be supplied, a weigh hopper, a conveyor between said bins and said weigh hopper to convey material at a perdetermined number of substantially constant rates whereby any selected ingredient can be carried from the bin holding that ingredient to said weigh hopper, means for selecting in a pre-determined order the stock bins from which ingredients are fed, means for deriving an analog signal proportional to the weight of an ingredient in the hopper, means for comparing said weight signal with an analog signal proportional to a programme set point weight for the selected ingredient and for deriving an error signal, means for each selected ingredient for accumulating the error signal, means for subtacting said accumulated error signals from the programme set point weight signal for that ingredient to give a feed set point weight signal for that ingredient, a weight reference-time converter for converting the feed set point weight signals for that ingredient into a time signal, means for applying said time signal for that ingredient to control the time for which said conveyor operates to convey that material.

6. In apparatus as set forth in claim 5 a low pass filter to which said feed set point weight signals are applied, means for differentiating with respect to time the filter signals, means for multiplying the differentiated signal by a transit time factor for the selected ingredient, further comparison means in which the multiplied signal is substrated from the feed set point weight signal for that ingredient to give a control signal, and means for stopping delivery of that ingredient to the conveyor when the control signal is below a set limit.

References Cited

UNITED STATES PATENTS

| | | | |
|---|---|---|---|
| 3,035,648 | 5/1962 | Williams | 177—210 X |
| 3,063,635 | 11/1962 | Gordon | 235—151 |
| 3,137,356 | 6/1964 | Shields et al. | 177—210 X |
| 3,254,728 | 6/1966 | Aquadro et al. | 177—210 X |
| 3,291,233 | 12/1966 | Mayer | 177—120 X |
| 3,362,490 | 1/1968 | Maxwell | 177—70 |

ROBERT S. WARD, Jr., Primary Examiner

U.S. Cl. X.R.

177—59, 70, 120, 164